(12) United States Patent
Koren et al.

(10) Patent No.: US 8,872,116 B2
(45) Date of Patent: Oct. 28, 2014

(54) METHODS AND APPARATUS FOR MULTI-CAMERA X-RAY FLAT PANEL DETECTOR

(71) Applicant: DenCT Ltd, Kibbutz Yagur (IL)

(72) Inventors: Jacob Koren, Haifa (IL); Eduard Batkilin, Nesher (IL)

(73) Assignee: Cmosaix Ltd, Yagur (IL)

( * ) Notice: Subject to any disclaimer, the term of this patent is extended or adjusted under 35 U.S.C. 154(b) by 0 days.

(21) Appl. No.: 13/735,252

(22) Filed: Jan. 7, 2013

(65) Prior Publication Data

US 2013/0221226 A1    Aug. 29, 2013

Related U.S. Application Data

(63) Continuation of application No. 13/011,551, filed on Jan. 21, 2011, now Pat. No. 8,350,219.

(60) Provisional application No. 61/297,416, filed on Jan. 22, 2010.

(51) Int. Cl.
*G01T 1/10* (2006.01)
*G01T 1/20* (2006.01)

(52) U.S. Cl.
CPC ............... *G01T 1/20* (2013.01); *G01T 1/2018* (2013.01)
USPC .................................................... 250/362

(58) Field of Classification Search
CPC ...................... G01T 1/20; G06K 2009/2015
USPC ........................................................ 250/362
See application file for complete search history.

(56) References Cited

U.S. PATENT DOCUMENTS

| | | | |
|---|---|---|---|
| 4,503,460 A | | 3/1985 | Skiebitz |
| 5,617,463 A | | 4/1997 | Beierlein |
| 5,818,900 A | * | 10/1998 | Vogelsong et al. ............. 378/62 |
| 6,483,893 B1 | | 11/2002 | Achtnig et al. |
| 7,094,203 B2 | * | 8/2006 | Inoue et al. ................... 600/439 |
| 7,496,177 B2 | * | 2/2009 | Miroshnychenko et al. 378/98.3 |
| 2002/0004626 A1 | * | 1/2002 | Abe ............................ 600/109 |
| 2002/0021786 A1 | | 2/2002 | Hamamoto et al. |
| 2002/0120195 A1 | * | 8/2002 | Hossack et al. .............. 600/443 |
| 2002/0196899 A1 | | 12/2002 | Karellas |

(Continued)

OTHER PUBLICATIONS

International Search Report for International Application No. PCT/IB11/00229 mailed Jul. 27, 2011.

*Primary Examiner* — Kiho Kim
(74) *Attorney, Agent, or Firm* — Wolf, Greenfield & Sacks, P.C.

(57) ABSTRACT

According to some aspects, a device comprising a plurality of cameras arranged in an array, each of the plurality of cameras producing a signal indicative of radiation impinging on the respective camera, the plurality of cameras arranged such that the field of view of each of the plurality of cameras at least partially overlaps the field of view of at least one adjacent camera of the plurality of cameras, to form a respective plurality of overlap regions, an energy conversion component for converting first radiation impinging on a surface of the energy conversion component to second radiation at a lower energy that is detectable by the plurality of cameras, and at least one computer for processing the signals from each of the plurality cameras to generate at least one image, the at least one processor configured to combine signals in the plurality of overlap regions to form the at least one image is provided.

20 Claims, 10 Drawing Sheets

(56) References Cited

U.S. PATENT DOCUMENTS

| | | |
|---|---|---|
| 2004/0144926 A1 | 7/2004 | Arques et al. |
| 2004/0211917 A1* | 10/2004 | Adamovics ................ 250/474.1 |
| 2005/0023438 A1 | 2/2005 | Hamamoto et al. |
| 2006/0267054 A1 | 11/2006 | Martin et al. |
| 2007/0189455 A1 | 8/2007 | Allison |
| 2008/0247514 A1 | 10/2008 | Taoka et al. |
| 2009/0003674 A1* | 1/2009 | Keupp et al. .................. 382/131 |

* cited by examiner

METHODS AND APPARATUS FOR MULTI-CAMERA X-RAY FLAT PANEL DETECTOR

RELATED APPLICATION

This Application claims the benefit under 35 U.S.C. §120 and is a continuation of U.S. application Ser. No. 13/011,551, entitled "METHODS AND APPARATUS FOR MULTI-CAMERA X-RAY FLAT PANEL DETECTOR" filed on Jan. 21, 2011, which claims priority under 35 U.S.C. §119(e) to U.S. Provisional Application Ser. No. 61/297,416, entitled "METHODS AND APPARATUS FOR MULTI-CAMERA X-RAY FLAT PANEL DETECTOR" filed on Jan. 22, 2010, each of which is herein incorporated by reference in its entirety.

BACKGROUND

Digital Radiology (DR) is a technology that uses flat panel detectors to produce digital X-ray images directly. DR detectors are substantially based on standard area (which developed historically from the production line sizes of x-ray film and x-ray film cassettes) devices having a medium that transfers high energy X-ray photons into electrical charge which are distributed and segmented into a matrix of pixels forming an image. For example, the charge at each pixel location may be digitized and the whole matrix of pixels forms an X-ray image of the converted charge. The X-ray image may then be transmitted and displayed on a computer screen.

There are two main major technologies generally used in such flat panel detectors: 1) direct digital detectors, where the X-ray photons are converted directly into charge by a flat surface layer of specific materials such as amorphous Silicon or amorphous Selenium; and 2) indirect digital detectors where an energy converter layer is used to convert the high energy X-ray photons into a very high number of lower energy light photons (e.g., photons in the visible spectrum). These lower energy light photons may then be converted into electrical charge by a large matrix semiconductor device. As discussed above, the charge at each pixel location may be converted into a digital value representing an intensity of the pixel in the digital X-ray image. However, such DR flat panel detectors are expensive and relatively complicated to manufacture.

To reduce cost and complexity, the relatively expensive large area semiconductor layers may be replaced with one or more semiconductor cameras. The cameras may be relatively inexpensive small area silicon pixel matrix cameras, such as those formed from arrays of charge-coupled devices (CCDs). Thus, the lower energy light photons coming out of the energy transfer layer (e.g., a phosphor screen) pass through a large lens and the image is focused on the small silicon chip to produce the transfer to charge and then into a digital image.

SUMMARY

Some embodiments include a device comprising a plurality of cameras arranged in an array, each of the plurality of cameras producing a signal indicative of radiation impinging on the respective camera, the plurality of cameras arranged such that the field of view of each of the plurality of cameras at least partially overlaps the field of view of at least one adjacent camera of the plurality of cameras, to form a respective plurality of overlap regions, an energy conversion component for converting first radiation impinging on a surface of the energy conversion component to second radiation at a lower energy that is detectable by the plurality of cameras, and at least one computer for processing the signals from each of the plurality cameras to generate at least one image, the at least one processor configured to combine signals in the plurality of overlap regions to form the at least one image.

Some embodiments include a method comprising converting first radiation impinging on a surface of the energy conversion component to second radiation at a lower energy, receiving at least some of the lower energy radiation at a plurality of cameras arranged in an array, each of the plurality of cameras producing a signal indicative of radiation impinging on the respective camera, the plurality of cameras arranged such that the field of view of each of the plurality of cameras at least partially overlaps the field of view of at least one adjacent camera of the plurality of cameras, to form a respective plurality of overlap regions, and processing the signals from each of the plurality cameras to generate at least one image, the at least one processor configured to combine signals in the plurality of overlap regions to form the at least one image.

Some embodiments include a device comprising a plurality of cameras, an energy conversion component capable of converting first radiation at a first energy to second radiation at a second energy lower than the first energy, and at least one refraction component positioned between the energy conversion component and the plurality of cameras to refract at least some of the second radiation emitted by the energy conversion component onto corresponding cameras of the plurality of cameras Some embodiments include a method comprising converting first radiation at a first energy to second radiation at a second energy lower than the first energy, and refracting at least some of the second radiation emitted by the energy conversion component and receiving at least some of the second radiation at a plurality of cameras.

Some embodiments include using any of the devices above to determine a location for high dose imaging. For example, the device(s) may further comprise at least one remote computer configured to selectively activate any of the plurality cameras. The method comprises performing a low dose x-ray exposure with a first set of the plurality of cameras activated to obtain a first low dose image. Performing one or more subsequent low dose exposures with a different set of cameras activated to obtain one or more subsequent low dose images, wherein the different set of cameras is chosen based at least in part on the first low dose image or one or more of the subsequent low dose images.

DETAILED DESCRIPTION

As discussed above, camera arrays may be used as detectors for x-ray imaging. Applicant has appreciated that various technologies alone or in any combination may result in improved image quality, more efficient image acquisition, more flexible imaging devices, and/or camera-based imaging solutions provided at lower costs. For example, one or more optical technologies may be used to collect more light released from the energy transfer layer to increase the signal-to-noise ratio (SNR), increased the detected quantum efficiency (DQE), and/or may focus or redirect light to reduce cross-talk between cameras, as discussed in further detail below. One or more camera technologies may be used to reduce cost, increase SNR, DQE and/or to improve the quality and/or integrity of resulting images. Camera array technologies described herein may improve diagnosis and treatment and may be used to facilitate medical procedures. The number and arrangement of cameras implemented in an array may be exploited to obtain higher SNR data and/or to allow for emphasis and/or suppression of desired subject matter in the image data.

Following below are more detailed descriptions of various concepts related to, and embodiments of, methods and apparatus according to the present invention. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

As discussed above, flat panel detectors using cameras to replace relatively high cost semi-conductor layers may reduce the cost of DR imaging equipment. However, conventional designs using a camera-based approach have suffered from poor image quality. The image quality of conventional solutions suffer, at least in part, because light collection may be relatively inefficient, resulting in poor DQE for the imaging device. Some of the inefficient light collection may be attributed to the distance between the energy conversion component and the cameras collecting the light emitted from the energy conversion component. This distance may be dictated by the focal length of the cameras employed as sensors in the camera array.

As a result, only some fraction of the light emitted by the energy conversion component reaches the lens and is registered to form the corresponding part of the image, negatively impacting the DQE of the device. In addition, because the lower energy photons released from the energy conversion component are emitted in all directions, not only are photons being lost as a result of the distance between the energy conversion component and the lenses, but some portion of the emitted photons actually register in neighboring or remote cameras, resulting in cross-talk that shows up as artifacts in the image.

Figure 1:
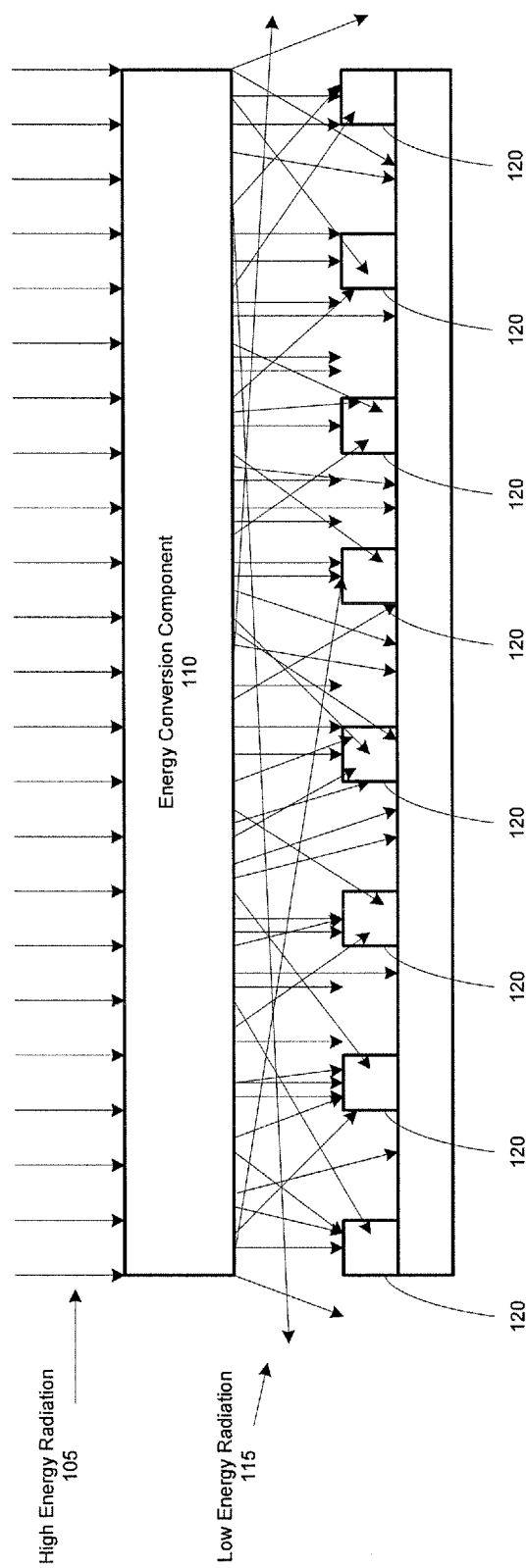
FIG. 1 illustrates a conventional camera-based x-ray imaging device.

FIG. 1 illustrates schematically some of the drawbacks of conventional camera implementations. Image sensor 100 includes a energy conversion component 110 and an array of cameras 120 such as an array of CCD cameras. High energy radiation 105 such as x-ray radiation (e.g., x-ray radiation that has passed through an object being imaged) impinges on the energy conversion component 110. The energy conversion component 110 converts the high energy radiation to low energy radiation 115 (e.g., photons in the visible light spectrum) due to the interaction between the high energy radiation 105 and the material of the energy conversion component 110. The energy conversion component may be made of any material capable of suitably converting the radiation, such as a phosphor layer or other material that emits lower energy radiation in response to absorbing x-ray radiation.

As discussed above, the low energy radiation is emitted from the energy conversion component at all directions. As a result of this omni-directional emission, coupled with the distance between the energy conversion component 110 and the cameras (e.g., as dictated by the focal length of the lens), substantial amounts of radiation are either lost or are detected by the incorrect camera. The resulting image may be of relatively low quality, having low SNR, DQE and/or may include relatively substantial cross-talk artifacts as schematically illustrated in FIG. 1.

Figure 2:
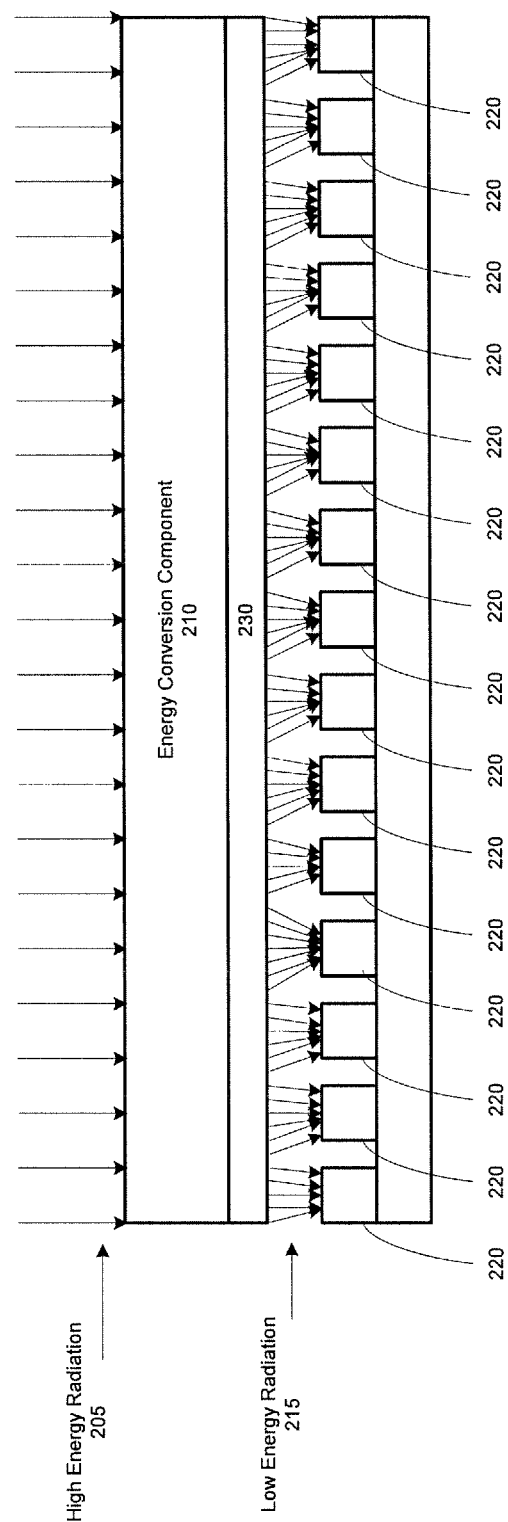
FIG. 2 illustrates a camera-based x-ray imaging device according to some embodiments.

Applicant has appreciated that by improving the light transfer between the energy conversion component (e.g., phosphor layer or screen that converts high energy X-rays to lower energy light photons in the visible spectrum) and the cameras, image quality may be improved. FIG. 2 illustrates an image sensor according to some embodiments. Image sensor 200 includes a number of improvements that may be used either alone or in any combination to facilitate improved light transfer. One improvement includes the addition of refractive layer 230 to address, at least in part, the omni-directional (or at least $2\pi$) emission of low energy radiation (a phenomena also referred to as "flare"). The refraction component 230 may be a high refraction layer or high dispersion layer (e.g., a high refraction coated glass) placed between the energy conversion component 210 and the cameras 220.

The refraction component operates to suppress (e.g., reflect) photons at angles larger than a critical angle (i.e., angles sufficiently far from the surface normal to the energy conversion component) to prevent flat angle photons from registering at neighboring or remote cameras, and to bend photons emitted at angles smaller than the critical angles (i.e., angles sufficiently near the surface normal to the energy conversion component) "inwards" to increase the amount of light that enters the lenses of the corresponding and appropriate cameras.

The refraction component 230 may be formed of a glass layer, a coated glass layer, multiple layers of glass and/or other material layers, individual refractive lenses or any other suitable configuration or refractive material that facilitates directing the emitted light to the lens of the correct camera. The refraction component 230 may be included to improve the SNR by increasing the amount of light reaching the appropriate camera (signal) and decreasing the crosstalk (noise). In addition, since more of the emitted radiation from the energy conversion component 210 reaches and is collected by cameras 220, the DQE of the image sensor also may increase.

As discussed above, the distance between the energy conversion component and the cameras in conventional image sensors allows valuable signal to either go undetected or be detected by the incorrect camera. The distance in conventional designs is, at least in part, dictated by the particular camera being used. In conventional image sensors, the CCD based cameras require a relatively significant distance to accommodate the focal length of the cameras, thus resulting in generally poor image quality due in part to the physical limitations of the camera themselves.

Applicant has appreciated that benefits of complementary silicon-oxide semiconductor (CMOS) cameras (e.g., flat lens CMOS cameras frequently used in cellular telephones) may be used to facilitate less expensive image sensors, without a reduction in image quality, and in some cases with improved image quality. Traditionally, CMOS cameras were perceived to produce images of insufficient quality for purposes of DR and therefore CCD cameras were selected as the only useable sensor solution. However, Applicant has appreciated that at least some of the advantages of CMOS cameras may be exploited not only to solve some outstanding issues of conventional image sensors for DR, but to deliver images of the same or greater quality as images obtained using CCD camera arrays.

One advantage of CMOS cameras is the decrease in focal length. Applicant has appreciated that this reduced focal length may be employed to position the CMOS cameras and the energy conversion component closer together, as schematically illustrated in FIG. 2. As a result, more of the light emitted from the energy conversion component will impinge upon the correct camera, instead of being missed altogether or detected by an adjacent or nearby camera. Another advantage of CMOS cameras are that they are less expensive to manufacture than CCD cameras. Therefore, many more CMOS cameras may be included in the sensor array without increasing the costs of the DR image sensor. As schematically illustrated in FIG. 2, additional CMOS cameras can be added to the array so that more of the emitted light is detected by one of the cameras in the array.

A further advantage of CMOS cameras is that they are smaller in size. As a result, more cameras can be positioned in a given area than with CCD camera solutions and the image sensor can be more densely populated with cameras, thus more optimally detecting the light emitted from the energy conversion component 210. Additionally, the smaller size (and lower cost) allows the cameras to be positioned such that multiple cameras detect at least some light for any given pixel. This overlap has many significant benefits, as discussed in further detail below. It should be appreciated that any CMOS camera may used in embodiments employing CMOS cameras, as the aspects are not limited in this respect.

Thus, as discussed above, Applicant has appreciated that using CMOS and/or flat lens technologies (e.g., camera technology similar to that used in cellular phones) may allow the cameras to be placed closer to the light emitting surface, thus increasing the light collection and improving image quality. In addition, the relative inexpensiveness of these technologies allows more cameras to be used, thus further decreasing the distance between the camera lenses and the light emitting layer. Use of CMOS/flat lens cameras allows more cameras to be utilized in a relatively inexpensive manner and allows the cameras to be brought forward in closer proximity to the energy conversion component. The use of CMOS/flat lens technologies may be used alone or in combination with the optical technologies herein above to increase SNR, DQE, reduce cross-talk and/or otherwise improve image quality.

A further problematic issue with conventional image sensors that may effect image quality and/or the operation of cameras in the image sensor is unconverted high energy radiation that penetrates the energy conversion component. In particular, some of the high radiation energy impinging on the energy conversion component may pass through without being converted to low energy radiation. As a result, this unconverted high energy radiation may impinge on the cameras and damage the electronic components, generate errant noise in the cameras or both. Applicant has appreciated that providing a blocking component of material that blocks at least a portion of this high radiation may prevent some or all of the unconverted high energy radiation from reaching the camera and/or associated electronic components of the image sensor.

Figure 3A:
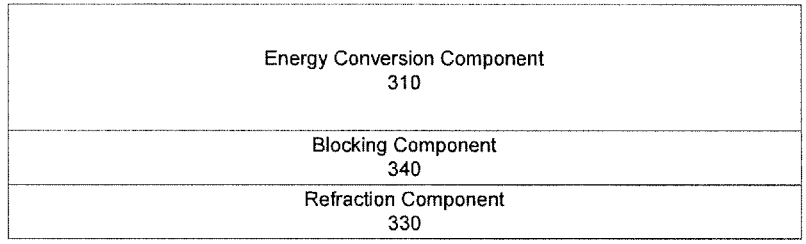
FIGS. 3A-3E illustrate using a blocking component to block unconverted x-ray radiation, according to some embodiments.
Figure 3B:
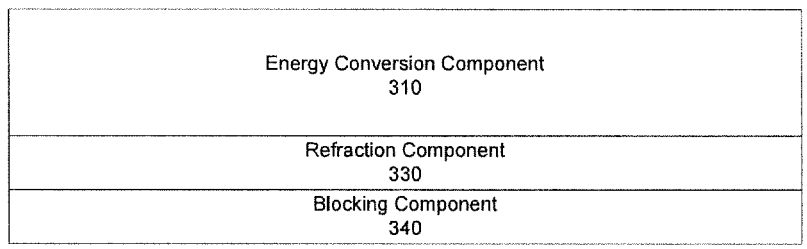

FIGS. 3A-3E illustrate blocking components suitable for reducing potentially deleterious and/or harmful high energy radiation from reaching the electronics of the imaging device. FIGS. 3A and 3B illustrate two embodiments wherein a separate blocking component 340 is provided before and after the refraction component 330, respectively, to block at least some of the unconverted high energy radiation. Blocking component 340 may be made of a leaded glass or other material capable of absorbing relatively high energy radiation such as x-rays.

Figure 3C:
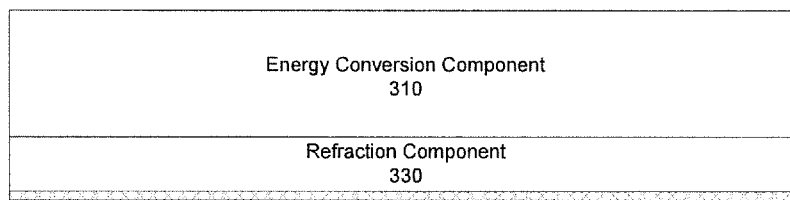
Figure 3D:
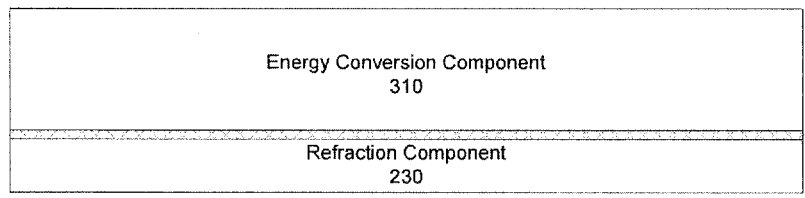
Figure 3E:
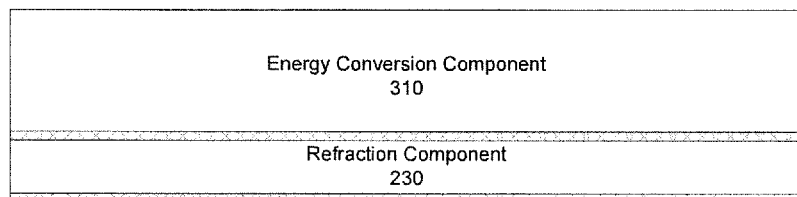

FIGS. 3C-E illustrate embodiments wherein blocking component 340' is provided as a coating on the refraction component 330, on the top surface, the bottom surface and both surfaces, respectively. The coating may be made from a leaded material or other material coating capable of absorbing at least some of the unconverted high energy radiation. Alternatively or in addition to the blocking components described above, a blocking component (e.g., a block layer or blocking coating) may be added to the lenses of the cameras to prevent high energy radiation from reaching the light sensitive areas and/or electronics of the camera. The blocking component may be made of material that is completely or partially transparent to the lower energy radiation emitted from the energy conversion component.

Figure 4:
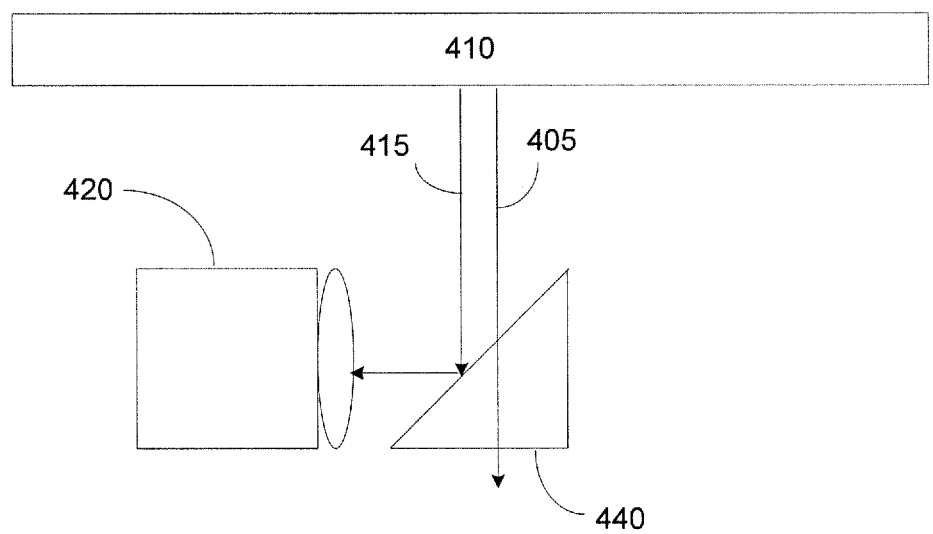
FIG. 4 illustrates using mirrors to prevent x-ray energy from entering the cameras, according to some embodiments.

According to some embodiments, mirrors are used to prevent unconverted high energy radiation from impinging on the camera and/or camera electronics. For example, in FIG. 4, the cameras 420 are arranged such that surface normal of the lens is directed substantially perpendicular to the surface normal of the refraction component 410. A mirror 440 made from material that reflects lower energy radiation 415 and passes higher energy radiation 405 is positioned such that the lower energy radiation is reflected into the camera lens, while the higher energy radiation 405 passes through the mirror and does not enter the camera and impinge on the sensitive areas and/or electronics of the camera. The embodiment illustrated schematically in FIG. 4 may be used alone or in any combination with the other techniques described herein for preventing unconverted high energy radiation from entering the camera and/or damaging the sensor electronics.

As discussed above, in order to prevent flare and glare of the light coming out of the energy conversion component (e.g., the phosphor screen or photon convertor) that converts the high energy X-ray photons into the lower energy seen light photons, the photons from each point on the phosphor screen are emitted in the 2 pi directions causing noise referred to as flare. In addition, the light reflected from the lenses is reflected back by bouncing from the white reflective face of the phosphor screen causing another component of optical noise referred to as glare.

In conventional camera-based solutions, cameras are distributed and arranged such that their combined viewing area covers the full image area of the light emitting surface with some overlap between each neighboring camera (to allow for stitching algorithms to stitch all the images together to produce one continuous large digital image). Cost considerations in conventional camera-based solutions limit the number of cameras used. In addition, the size of conventional CCD cameras and the associated electronics for transferring charge from the CCD elements physically limit how close together adjacent cameras may be positioned. As a result, the cameras have to be placed at a further distance from the light emitting layer, resulting in unnecessary loss of signal and increase in noise from cross-camera registration.

In camera-based systems using an array of cameras to capture an image, each individual portion of the whole image captured by individual cameras must be combined together to form the whole image. This process is referred to as "stitching" due to its conceptual similarity to stitching together the pieces of a quilt to form the entire quilted blanket. Conventional camera-based systems arrange the camera array such that the field of view of adjacent cameras are slightly overlapping. Typically, the overlap region is used to register the data to determine how adjacent sub-images should be aligned for stitching. Numerous stitching algorithms are known to stitch together sub-images from adjacent cameras to form the full images. Applicant has appreciated that overlap regions may be used for a number of purposes other than stitching including, but not limited to, increasing SNR, improving image quality and/or performing image enhancement, as discussed in further detail below.

Figure 5A:
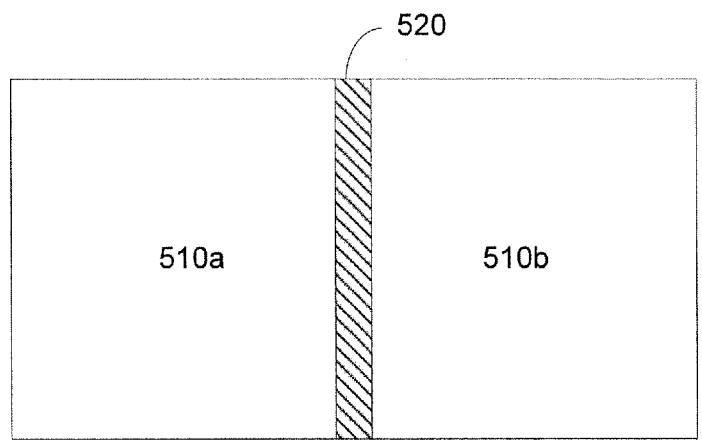
FIGS. 5A-5D illustrate concepts related to overlap regions, according to some embodiments.
Figure 5B:
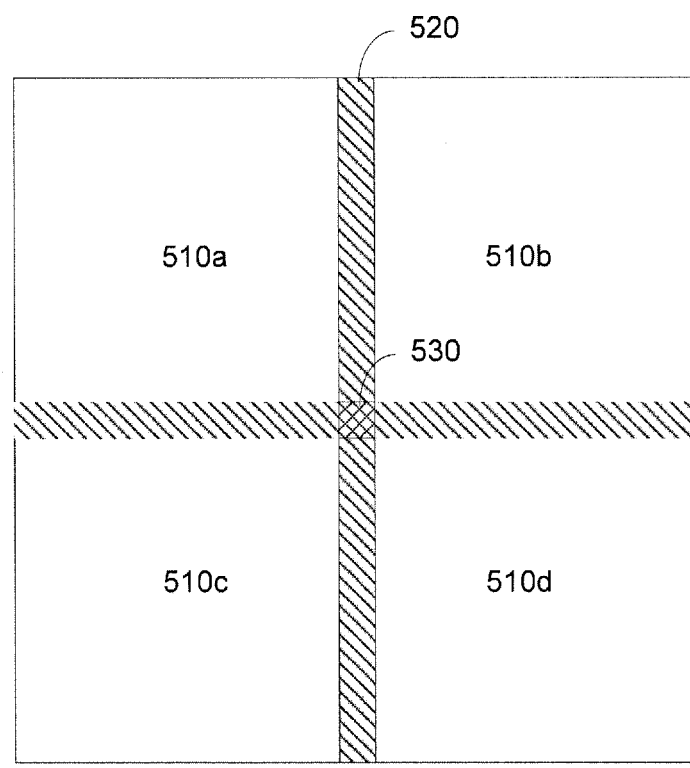
Figure 5C:
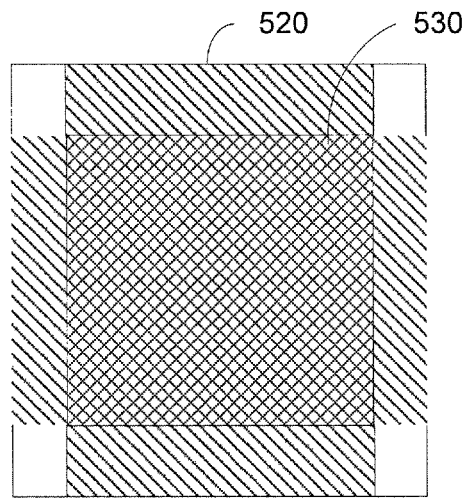

FIGS. 5A and 5B illustrate the fields of view for two cameras and four cameras, respectively, positioned such that their fields of view have one or more overlap regions. For example, FIG. 4A illustrates a field of view 510a representing the portion of an image sensed by a first camera and a field of view 510b representing the portion of an image sensed by a second camera. Due to the positioning of the cameras, there is a small overlap region 520 where the two cameras "see" substantially the same information (i.e., both cameras are sensing the same portion of the image). Because both cameras will capture highly correlated image information in the overlap region, this region may be used to register or match the data so that the two separate images can be aligned for stitching. FIG. 4B illustrates the overlap region for four fields of view 510a, 510b, 510c and 510d of four adjacent cameras and the corresponding overlap region 520 for any two adjacent cameras, and overlap region 530 where all four camera's fields of view overlap.

It should be appreciated that the illustrations in FIG. 5 are schematic and the fields of view and overlap regions are provided to illustrate the concept of overlapping fields of view. However, the fields of view and overlap regions may be of any size or shape (e.g., the fields of view may be circular or polygonal and therefore generate different shaped overlap regions) depending on the properties, positioning and/or types of the cameras used in the camera-based image sensor. The principles described herein are suitable for fields of views and overlap regions of any shape and/or size, and the aspects are not limited in this respect.

As discussed above, Applicant has appreciated that this overlap region can be further utilized to increase SNR, DQE and/or to perform image enhancement. In connection FIG. 5A, the first and the second camera have both captured substantially the same information in the overlap region 520. As such, there is approximately twice the information (i.e., approximately twice the signal) in the overlap region. Referring to FIG. 5B, the overlap region 520 has twice the signal and overlap region 530 has substantially four times the signal. The additional information in the overlap regions may be used to increase the SNR by combining the data in any number of ways including summing, averaging, weighted averaging or any other suitable operation that makes use of the additional data available in the overlap region. Alternatively or in addition to any number of linear combinations, non-linear combinations of the data in the overlap regions may be used, as the aspects are not limited in this respect.

Figure 5D:
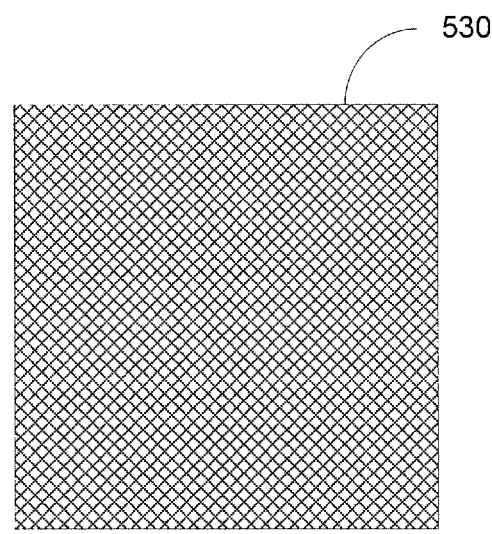

As discussed above, the use of CMOS/flat lens technology cameras allows for a higher density of cameras to be arranged in a given area. Thus, the cameras may be positioned closer together. Applicant has appreciated that not only does this increase the DQE (e.g., by collecting more light emitted from the energy conversion component), but the increased density may be such that the field of view of adjacent cameras can overlap to any desired extent. For example, in FIG. 5C four cameras have been positioned such that substantial portions of the field of view form the overlaps region 530. In FIG. 5D, four cameras are positioned such that the overlap region 530 is substantially the entirety of the fields of view of the cameras. For example, overlap region 530 may correspond to one portion or "tile" of a full image, and each camera may separately capture the entire sub-image corresponding to the tile. Applicant has appreciated that by forming an image entirely from such tiles, each pixel in the image can be formed from the information captured by multiple cameras (e.g., 2, 4, 6, 8 cameras, etc.).

Figure 6:
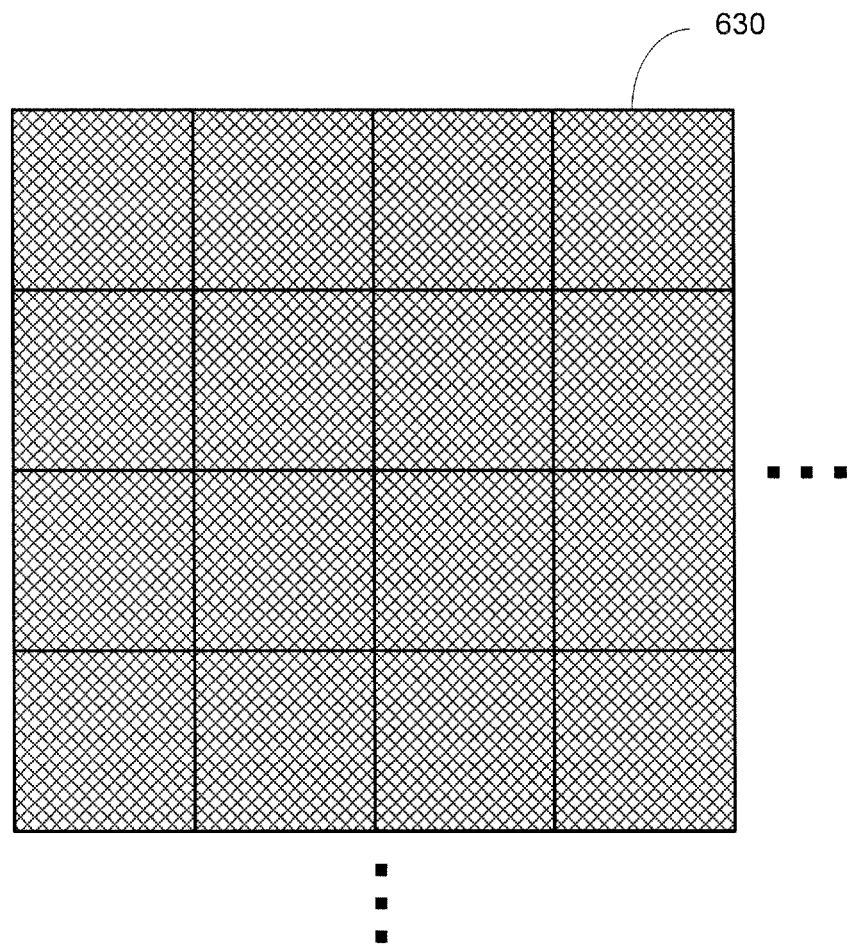
FIG. 6 illustrates tiles forming an image with a plurality of image layers, according to some embodiments.

FIG. 6 illustrates a portion of an image formed from tiles substantially produced by overlap regions of two or more adjacent cameras. For example, tiles 630 may be similar to image tile 530 in FIG. 5D formed from the overlap region of four adjacent cameras. However, image tiles may be formed from overlap regions of more or fewer adjacent cameras, as the aspects are not limited in this respect. In addition to image quality improvement achieved from the increase in signal and reduction of noise, the overlapping field of views may be exploited to perform image enhancement such as emphasizing and/or suppressing selected subject matter from the images and/or performing dual energy imaging, as described in further detail below.

In some embodiments, the cameras are disposed in number and proximity such that each pixel in the resulting full image (i.e., fully stitched image) will result from data from at least two cameras. The resulting image will have improved DQE enabling the choice between dose reduction or improved image quality (for the same dose). Since each pixel location is covered by at least two cameras, the resulting data will have at least two arrays of data representing the entire image. These "layers" may be used in a number of ways to improve image quality, reduce dose and/or facilitate various imaging procedures, as discussed in further detail below. Further benefits may be achieved using a camera array layout wherein more than two cameras cover each pixel location in the image, thus improving light collection, image quality, increasing the DQE and/or enabling various image enhancing techniques.

Figure 7:
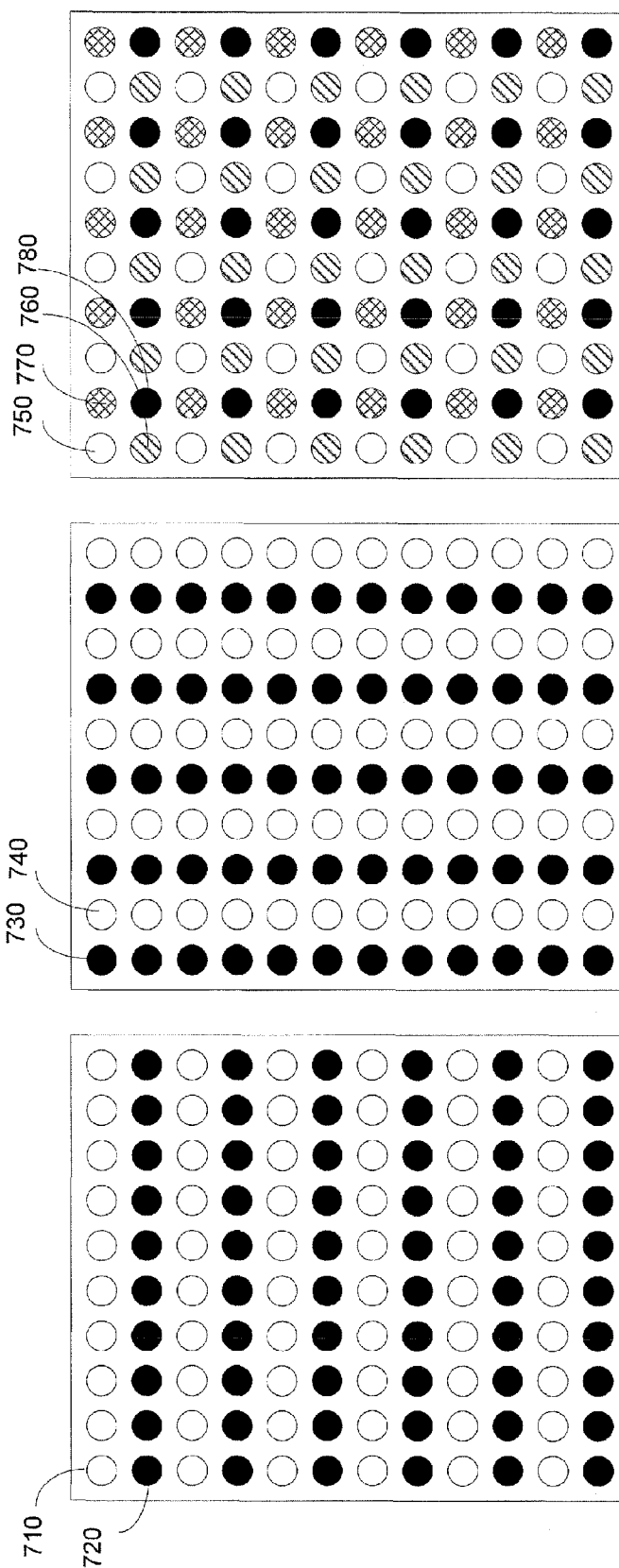
FIGS. 7A, 7B and 7C illustrate concepts related to obtaining multi-layer images, according to some embodiments.

As discussed above, by arranging cameras in number and proximity, multiple cameras can obtain data for each pixel location in an image. As a result, the cameras will capture multiple independent images of the same object (e.g., a patient undergoing medical imaging). Each independent image obtained from the camera array using such overlapping cameras is referred to herein as a layer. For example, in an exemplary grid layout shown in FIGS. 7A-7C, the even and odd cameras may be utilized to obtain a multi-layer image. In FIG. 7A, the odd rows of cameras 710 (denoted by white circles) and the even rows of cameras 720 (denoted by black circles) may each capture a respective image layer to provide a two layer image by overlapping the fields of view of adjacent rows. It should be appreciated that if the fields of view overlap to a certain extent, each layer will represent a version of the entire image (i.e., multiple images will be obtained).

Similarly, as shown in FIG. 7B, the odd columns of cameras 730 (denoted by the black circles) and the even columns of cameras 740 (denoted by the white circles) may capture the respective layers to provide a tow layer image by overlapping the fields of view of adjacent columns. In FIG. 7C, both odd/even columns and odd even rows are utilized to capture a multi-layer image. In particular, odd column and odd row cameras 750 (denoted by the white circles) may capture a first layer, odd column and even row cameras 760 (denoted by the diagonal hatched circles) may capture a second layer, even column odd row cameras 770 (denoted by the cross-hatched circles) may capture a third layer, and even column even row cameras 680 (denoted by the black circles) may capture a fourth layer. By positioning the cameras appropriately, any number of layers may be captured up to the physical limitations of the camera dimensions and fields of view. It should be appreciated that the grid arrangement is merely exemplary and any other pattern may be used such as circular or honeycomb patterns, as the aspects are not limited to the number of layers or the pattern of overlapping cameras.

As discussed above, the layers in a multi-layer image may each comprise a complete image of the object being imaged. This "redundant" information may be used to increase the SNR (e.g., by summing the layers to increase the amount of signal in the final image) and to increase the DQE (e.g., the increased density of cameras may optimize the percentage of light emitted by the energy conversion component that is detected by at least one of the cameras, rendering the image sensor increasingly efficient). In embodiments using CMOS cameras, such techniques may be capable of producing images of higher quality than solutions that utilize more expensive CCD cameras, however, improved image quality is not a limitation or a requirement.

As discussed above, the multiple layers may also be used to perform image enhancement, such as emphasis and/or suppression of particular subject matter of interest (e.g., emphasis/suppression of either hard or soft tissue in the body). Techniques for image enhancement include both spatial and temporal techniques, which may be used alone or in any combination to assist in enhancing the images as desired. Applicant has appreciated that image enhancement via emphasis/suppression of selected tissue may be achieved, at least in part, by controlling the gain on the cameras either spatially (e.g., using different gains for cameras in different layers) or temporally (varying the gain over an acquisition cycle) or both, as discussed in further detail below.

X-ray radiography is typically performed by detecting the extent of x-ray attenuation caused by the various regions of the object exposed to the x-ray radiation. Higher density material will attenuate the x-ray radiation to a greater extent than lower density material. Thus, in the body, hard tissue such as bone and cartilage will attenuate x-rays to a greater extent than softer tissue such as the organs. At the detector (i.e., camera), the hard tissue therefore corresponds to less radiation impinging on the detector (resulting in a smaller magnitude signal from the cameras) and soft tissue corresponds to more radiation impinging on the detector (resulting in a larger magnitude signal from the cameras). Using this understanding, Applicant has appreciated that the gain on the cameras may be controlled to selectively emphasize/suppress subject matter of desired density. In particular, the higher the gain, the more that hard tissue (e.g., bone, cartilage, etc.) will be emphasized and the lower the gain, the more the hard tissue will be suppressed and the soft tissue emphasized.

CMOS cameras have a useful property in that the gain on each camera may be individually controlled. That is, the gain on each individual camera may be set to a desired level. Applicant has appreciated that setting the gain of cameras in each respective layer of a multi-layer image can provide layers with different ranges of density material being emphasized or suppressed. The multiple layers may then be combined in any number of ways to enhance the image by either suppressing certain material to better observe subject matter of interest and/or emphasizing certain material so that it appears more prominently in the image. As such, the individual camera gains can be used to perform selective image enhancement. Such techniques may provide physicians, diagnostitians or other medical professions with images that are better suited for observing the subject matter of interest for a particular medical imaging application or procedure.

Referring back to FIGS. 7A-7C, the cameras in the respective layers may be set to desired gains to perform image enhancement. For example, in FIGS. 6A and 6B, the even rows/columns may be set with a relatively low gain and the odd row columns may be set to a relatively high gain to capture layers with different density materials emphasized/suppressed. In FIG. 7C, each of the four layers may be set with a different gain to capture layers with even richer image enhancement capabilities. Alternatively, for the purposes of image enhancement, the four layers in FIG. 7C may be grouped into two different gains (e.g., the layers associated with diagonal cameras may be given the same gain) to capture four layers of images with dual gain information. It should appreciated that gains set for the multiple layers in a multi-layer image may be set to any desired level using any desired combination or pattern of cameras, as the aspects are not limited in this respect.

As discussed above, image enhancement may also be performed by varying camera gains temporally. As a general matter, direct radiography using a camera-based solution often involves integrating the camera signal over some interval of time (e.g., an interval substantially the same as the duration of the x-ray exposure) to obtain the "value" corresponding to the amount of light detected for the corresponding pixel (i.e., the camera signal is summer over a given interval to give the pixel value associated with the corresponding camera). However, in CMOS cameras, the interval over which the signal is integrated can be selected as desired. As a result, the duration of an exposure can be divided into multiple intervals over which the signal is integrated to give multiple output values from each camera. Each interval, or designated intervals, may be assigned different gains. As such, each camera can have multiple signals for a single exposure, each set at a different gain level. As a result, each camera may produce multiple outputs at different gains for a single x-ray exposure.

As a simple example, during a single x-ray exposure, two signals may be acquired from each camera by integrating over two separate intervals that are each approximately half of the x-ray exposure. During the first interval, the gain may be set to a relatively low gain and during the second interval, the gain may be set to a relatively high gain (or vice versa). As a result, each camera will capture image information in which subject matter of different densities are emphasized or suppressed. Thus, the information at each camera can be used to perform image enhancement. Accordingly, image enhancement via gain variation may be performed with or without multi-layer imaging by temporally obtaining image information at different gains.

It should be appreciated that the exposure duration may be divided into any number of different intervals to obtain as many or as few signals from each camera during a single exposure. The gains assigned to the intervals may be chosen as desired to emphasize/suppress subject matter according to a particular imaging process. Other techniques may include using different gains with non-linear combinations of the multiple layers to enhance or eliminate information related to a specific density. For example, such techniques may enable focusing on particular biological structure such as obscuring or eliminating the ribcage in a chest image while enhancing the soft tissue of the lungs or vice versa (i.e., enhancing the ribcage (hard tissue) and eliminating or reducing the soft tissue). It should be further appreciated that the above described spatial and temporal gain variation techniques can be used alone or in any combination, as the aspects are not limited in this respect.

Applicant has appreciated that the temporal aspect of the CMOS cameras may be further utilized to perform dual energy or multiple energy imaging. Dual energy imaging exploits the physical phenomena that x-ray radiation of different energies will be absorbed differently by material of different densities. Accordingly, if attenuation information is obtained from x-rays of different energies, the attenuation information can be compared to emphasize/suppress subject matter of selected densities. Applicant has appreciated that in many x-ray sources, the x-ray energies typically vary during power-up. That is, at the beginning of an exposure (i.e., when the x-ray source is first energized), the x-ray source electronics require some finite ramp-up time to reach full power. During the ramp-up interval, the energy in the x-rays is relatively low and then increases over a power-up interval until the x-ray source has achieved steady-state and is operating at the nominal voltage, current and/or power levels associated with the x-ray source.

Applicant has appreciated that by dividing up the interval over which the camera signal is integrated so that at least one interval generally corresponds to the ramp-up period of the x-ray source, at least one camera output will be representative of attenuation information of lower energy x-rays. One or more subsequent intervals may generally correspond to the steady state period of the x-ray source so that at least one camera output will be representative of attenuation of higher energy x-rays. Having obtained attenuation information from at least two different energy levels or ranges of energies, any of various dual energy x-ray techniques may be applied to perform image enhancement. It should be appreciated that multiple intervals may be established during the ramp-up to obtain camera outputs during any number of intervals in the duration in which the x-ray source is powering up. The different energies in such intervals may be used to obtain even richer attenuation information from a number of x-ray energies or ranges of x-ray energies.

Additionally, multi-layer imaging may also be utilized to perform dual energy (or multiple energy) imaging. That is, the cameras in multiple layers may be assigned different intervals during the exposure period to collect attenuation information form x-rays of respectively different energies. For example, by operating the multiple cameras sequentially in time, a first set of cameras (e.g., associated with a first layer) will capture data from the relatively low energy radiation associated with the ramp-up interval, while a second set of cameras (e.g., associated with a second layer) will capture data from the relatively high energy radiation associated with the steady-state interval, thus obtaining separate images at different radiation energies.

It should be appreciated that any number of sets of cameras may be used (e.g., any number of layers) to capture data at a respective different radiation energy levels, as the aspects are not limited in this respect. The resulting images may be processed and manipulated in the same manner as other dual energy (or multiple energy) images to achieve the same advantages and/or benefits. It should be further appreciated that any of the above techniques may be used alone or in any combination, as the aspects are not limited in this respect or to any combination explicitly described herein.

Figure 8:
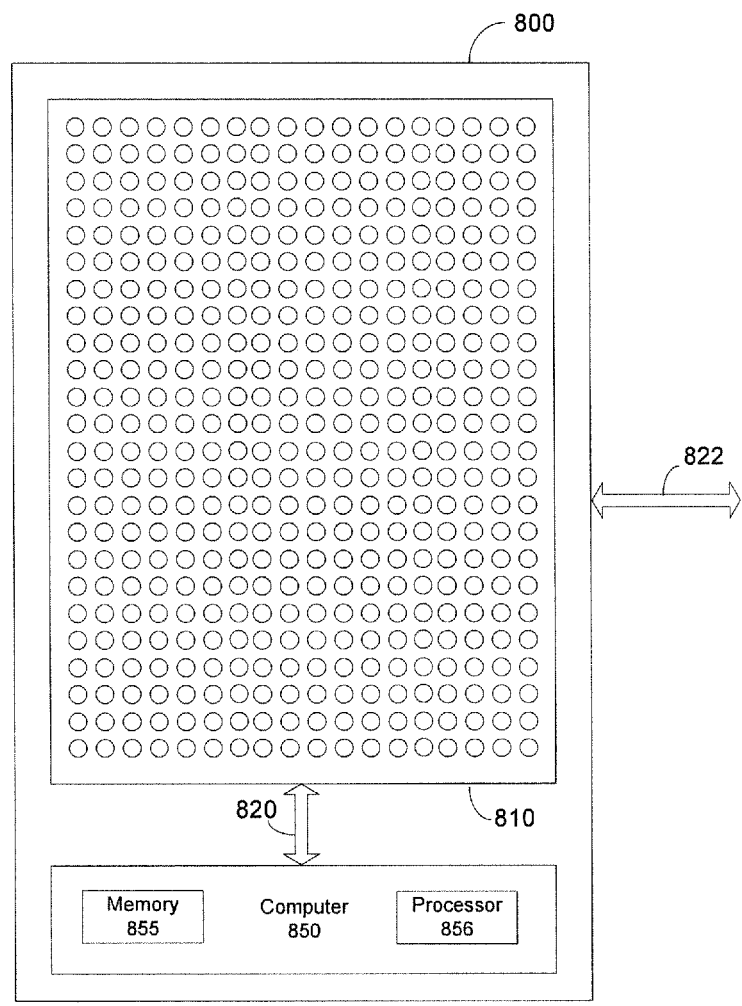
FIG. 8 illustrates a device for obtaining x-ray images, according to some embodiments.

FIG. 8 illustrates a direct radiography device in accordance with some embodiments. DR device 800 includes a camera-based image sensor 810 for capturing image information from an x-ray source. Camera-based image sensor 810 may be any of the image sensors described herein capable of capturing image information by detecting radiation converted from the x-ray source, and at least comprises a plurality of cameras 805 (e.g., an array of CMOS cameras) arranged to capture radiation down-converted (e.g., using an energy conversion component) from x-rays emitted from an x-ray source. The plurality of cameras 810 provide respective outputs indicative of the detected radiation to connection 820 to provide image data.

DR device 800 may also include computer 850 adapted to receive the signal outputs from the image sensor. Computer 850 may include a memory 855 and one or more processors 856 capable of accessing memory 855. Computer 850 is configured to received the data from the image sensor and to generate one or more images based on the data using processor(s) 856 executing one or more algorithms stored in memory 855. Thus, computer 850 may be configured to process the data in any of the ways discussed herein (e.g., process overlap or multi-layer data, process spatially and/or temporally divided data, or any other image processing method described herein to produce one or more images of the object exposed to the x-ray radiation). Computer 850 may perform other operations not specifically discussed herein to generate images from the camera outputs.

Memory 855 may comprise any type of tangible, non-transitory computer readable storage medium or storage device capable of storing data, instructions, etc, and may include ROM, RAM, disk storage, cache and/or any other storage medium, examples of which are provided below, and may be implemented in any number of ways. Memory 855 may be encoded with instructions, for example, as part of one or more programs that, as a result of being executed by processor 856, instruct the computer to perform one or more of the methods or functions described herein, and/or various embodiments, variations and/or combinations thereof. Memory 855 may also store image data received by input 820 or otherwise stored in computer 850.

Computer 850 may also be configured to operate the image sensor. For example, computer 850 may control which cameras are operating, may set/apply gains to be used for each camera in the array, may establish the one or more intervals over which the camera collects image data (e.g., for integration to produce an output), or may otherwise control the operation of image sensor 810. Computer 850 may include all of the necessary electronics to interface with the camera array and the algorithms to process the captured image data. However, computer 850 need not include all of the above described functionality, but may include some or all of the described control and processing capabilities of the DR device 800.

In some embodiments, DR device 800 also includes one or more input/outputs devices 822 capable of providing information external to the DR device and/or capable of receiving information from one or more external devices. For example, I/O device 822 may include an output capable or providing images produced by the DR device to an external computer and/or display. Furthermore, I/O device 822 may include an input that allows an external computer to control the image sensor. For example, in some embodiments, internal computer 850 may not be implemented and/or some or all of the functionality described above as performed by internal computer 850 may be performed by one or more external computers such as a personal computer (PC), work station, general purpose computer, or any other computing device.

As such computer 850 may be integrated into DR device 800 or may be a separate stand-alone system (or both), either proximate or remote from DR device 800. For example, when external, computer 850 may be connected to DR device 800 over a network and/or connected to multiple DR devices. For example, I/O device 822 may be configured to communicate with a local computer or a remote computer either over physical connections and/or wirelessly. It should be appreciated that any computing environment may be used, as the aspects described herein are not limited to use with a computer system of any particular type or implementation.

Some medical procedures use x-ray imaging technology to locate a region of interest. In particular, since a region of tissue or organ of interest may be internal and cannot be seen during positioning, x-ray imaging is used. Conventionally, such procedures are performed using a mechanical device called a "Bucky." The Bucky is constructed as a magazine that a x-ray film cassette can be inserted into for taking one or more x-ray exposures. The Bucky magazine can be moved manually under the patient table in the XY plane parallel to the table top. Normally, the Bucky magazine is held tight in place by a breaking system and, when required to be moved, the technician holds a special handle to release the breaks and move it as desired to position the cassette under the area to be exposed. Motion of the magazine is achieved using an XY system comprising the necessary rails and chains. Under the magazine there is a device called an Image Intensifier with its radiation input side right under the Bucky's magazine. The image intensifier is a large image tube with special crystal scintillator at the front that transfers X-ray photons into electrons that are accelerated into small phosphor screens with a video camera on its back end.

In a conventional procedure, a patient is set on the table and the x-ray system is activated in a low dose mode while the Bucky mechanism is positioned based on watching a video of the low dose images provided by the image intensifier. The technician continues to operate the Bucky mechanism until the region of interest or the desired body organ enters the field of view and is positioned as desired. This procedure (fluoroscopy or flouro-mode) is performed under very low radiation and is used for positioning only where image quality may not be critical. Although the procedure is performed under very low radiation levels, it requires the technician to position and move the Bucky manually, standing very close to the radiation source. As the desired position is achieved, the technician inserts the film or CR cassette into the Bucky, moves into the control room and provides a high energy radiography dose. The technician then may return to the Bucky to retrieve the cassette to transfer the cassette to the appropriate film processor or CR reader. This procedure is relatively inconvenient and may expose the technician to radiation unnecessarily. When DR techniques are used, a relatively complicated mechanical engineering change typically must occur as the magazine that holds the cassette need to be changed to accept the much thicker DR detector.

Figure 9C:
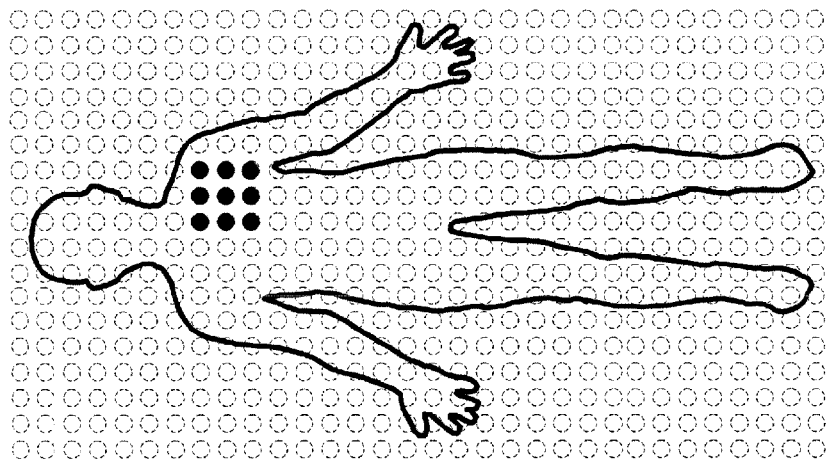
FIGS. 9A, 9B and 9C illustrate methods and apparatus for remotely activating selective cameras to locate the correct region to perform relatively high dose imaging, according to some embodiments.
Figure 9B:
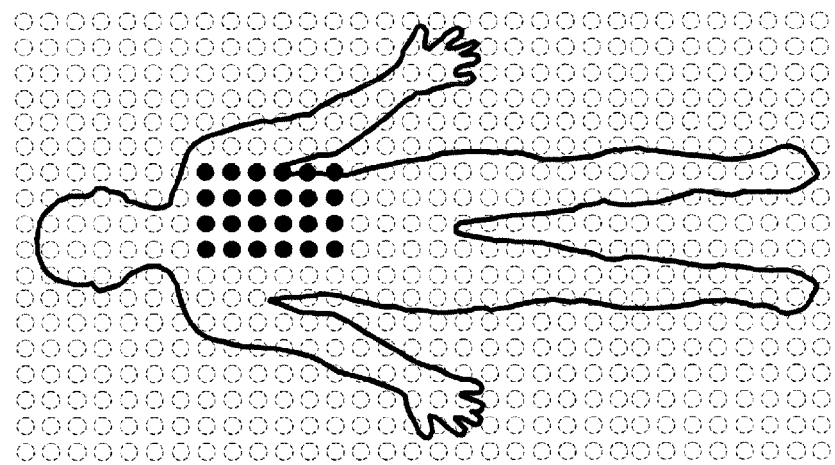
Figure 9A:
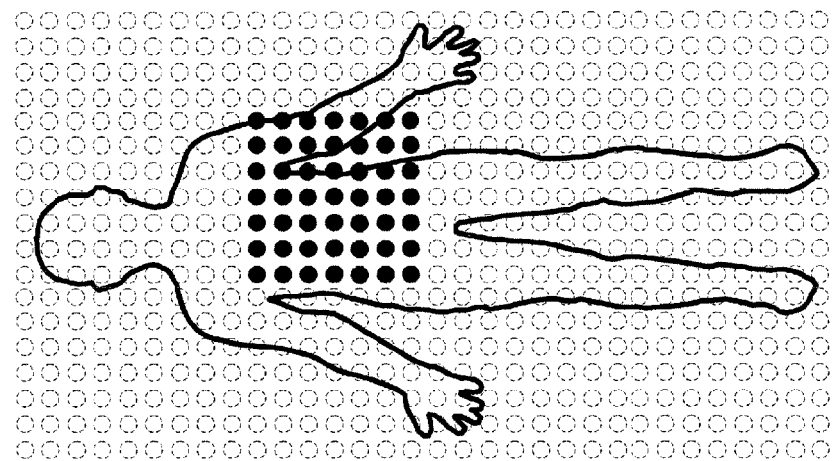

Applicant has appreciated that using camera array techniques as a detector may facilitate a more efficient, effective and safer medical procedure. In some embodiments, a camera-based image sensor as described herein detector that is large enough to image a relatively substantial portion of a patient (or the entire patient as illustrated schematically in FIG. 9) is provided. This large area flat detector is part of the RF system table top and may be attached to its underside. The cameras in this detector may have the ability to work in cine mode meaning that they can produce synchronized frames at, for example, 30 frames per second. As a result, a real time video sequence of the exposure region may be produced. However, instead of having to manually maneuver the Bucky system, a subset of the cameras may be operated to image a particular region. This subset may then be varied (i.e., the subset of cameras being operated may be changed by adding or removing cameras as desired) until the proper subset of cameras is located that will image the desired region of the body. As shown in FIGS. 9A-9C by the black circles, the active cameras may be selectively operated until the desired subset of cameras is located.

It should be appreciated that the selected area (e.g., the subset of cameras to be operating at any given time) may be performed using touch panel or joystick or any other suitable interface device. The selected area can be enlarged or minimized to the desired size and then be "moved" on the full area using the pointing device (touch screen, joystick or trackball), by adding and dropping tiles thus "moving" virtually the area of viewing onto the selected area of interest.

As described above, moving the selected area may be performed in low dose mode and may be monitored via a video feed. It should be appreciated that the selected area can be enlarged, minimized and moved remotely such that the technician need not be near the radiation source. That is, the whole procedure may be performed remotely while the technician is in a control room using computer pointing device (touch-screen) without being exposed to radiation. When the desired positioning is achieved, the selected active detector area is switched into high radiography dose mode and the image of the desired region is acquired. The resulting image may appear immediately on the computer screen in the control room enabling immediate quality control and additional acquisition if required without moving the system or the patient.

Applicant has further appreciated that the system described in the foregoing may be coupled with an overhead video camera to assist surgeons in correctly identifying locations in which to operate. X-ray images have conventionally been used to guide surgeons during an operation or procedure. However, there is a limit to the usefulness of using just an x-ray image. In particular, it may be difficult to correctly identify the correct place to make an incision, insert arthroscopic equipment such as an endoscope, or otherwise enter the body based just on an x-ray image of the internal structure of the patient. This difficulty is exacerbated in overweight and obese patients.

By placing an overhead video camera at a known location, the video images may be mapped to the x-rays images obtained from the camera-based sensor. The two images may be superimposed such that the surgeon can view the internal structures of the patient simultaneously and aligned with the external video of the patient. As a result, the surgeon may much more easily identify insertion points and navigate during the operation or procedure.

Applicant has appreciated that camera-based technologies may be used to construct large imaging areas. Since x-rays cannot be bent and there are no X-ray lenses, the X-ray films and today's CR cassettes and DR detectors generally have the size of the organs to be exposed and the larger standard area used is 17"×14" (35 cm×43 cm). The relatively small size of these conventional detectors requires using a multitude of standard size film, cassettes over several exposures in order to image large areas (e.g., a full body image). The images may then be stitched together to enable the doctor to view the multiple images as one large image.

Applicant has appreciated that the relatively low cost element/cameras used in camera-based detectors renders the size of the detector practically limitless. Accordingly, camera-areas may be constructed to handle large area imaging in a single exposure. Many imaging applications require larger areas than available using standard medical sizes. Camera-based detectors can be constructed at any size, allowing for relatively simple, efficient and safe large area imaging. The applications for large area imaging are limitless, several applications of which are described in further detail below.

Medical "long bone" imaging comprises full leg imaging in a standing position. This imaging procedure is used by orthopedics to view the leg while standing under normal body load. Conventionally, this imaging procedure is performed using a combination of three or more standard sizes cassettes wherein the results are "stitched" to enable the doctor to view the whole organ (e.g., the entire long bone). A single camera-based detector can perform the task with one single exposure and the results may be viewed on the screen immediately. Spinal imaging is frequently used in orthopedics to image the full length image of the spine such as in the case of scoliosis. Using a single camera-based detector, angle measurements may be improved since no stitching is required as in conventional imaging.

Emergency/military "whole body" imagine may be required in the case of an emergency when victims/patients are brought into an emergency facility (e.g., a field facility). In such circumstances, the whole body may need to be imaged to quickly diagnose the full body for fractures or shrapnel. Conventionally, this procedure is performed using 12 to 14 standard 14"×17" exposures, which takes excessive time and is very cumbersome specifically under pressure of emergency and/or when multiple victims need to be imaged. Camera-based detectors as described herein can be used to produce an image of the entire body using a single exposure, and without the need to keep track of which portion of the body has been imaged and which has not, and which cassettes and the associated sub-images belong to which victim.

Veterinary images, for example, for equine may require large imaging areas. For example, imaging a horse's legs is a routine for an equine veterinarian. However, this is an intense labor task. This task is often performed in the field and requires multiple exposures since the legs are long and the detector's size is small. DR systems are not designed for field use and their cost may make them impractical for this task. Camera-based detectors described herein can provide the full length of the horse's leg in a single exposure. Large pets such as a large dog or any other large animal is problematic because they move and their size makes the full body exposure a complicated task. Such an imaging task can be achieved by a large dedicated camera-based detector.

In industry and/or security, nondestructive testing of large objects may need to be performed. When large objects need to be exposed, very large camera-based detectors can be designed. For example, ship containers can be exposed in one exposure by a container size camera-based detector. In airports, even very large luggage can be exposed in a single exposure using camera-based detector technology. Other applications requiring large imaging areas may equally benefit from the camera-based imaging techniques described herein, and the aspects are not limited for use with any particular application.

Various aspects of the present invention may be used alone, in combination, or in a variety of arrangements not specifically discussed in the embodiments described in the foregoing and is therefore not limited in its application to the details and arrangement of components set forth in the foregoing description. The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above. The controller may be part of one or more computers that are programmed to perform the associated function.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a tangible, non-transitory computer readable storage medium (or multiple such computer readable storage media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A device comprising:
a plurality of cameras arranged in an array, each of the plurality of cameras producing a signal indicative of radiation impinging on the respective camera and corresponding to a respective image region corresponding to the field of view of the respective camera, wherein the image region from each of the plurality of cameras is combined to produce a combined image substantially corresponding to the combined field of view of the plurality of cameras, and wherein the plurality of cameras are arranged such that the field of view of each of the plurality of cameras overlaps the field of view of at least one adjacent camera of the plurality of cameras so that the respective image regions overlap to form a respective plurality of overlap regions wherein each pixel location in the combined image corresponds to pixel locations in the image regions of at least two of the plurality of cameras within the respective overlap region;
an energy conversion component for converting first radiation impinging on a surface of the energy conversion component to second radiation at a lower energy that is detectable by the plurality of cameras; and
at least one computer for processing the signals from each of the plurality cameras to combine the image regions from the plurality of cameras to generate the combined image, the at least one computer configured to combine signals in the plurality of overlap regions to improve image quality of the combined image.

2. The device of claim 1, further comprising
at least one refraction component positioned between the energy conversion component and the plurality of cameras to refract at least some of the second radiation emitted by the energy conversion component onto corresponding cameras of the plurality of cameras.

3. The device of claim 1, wherein the at least one computer is configure to combine signals in at least one overlap region to increase signal-to-noise ratio.

4. The device of claim 3, wherein the at least one computer performs a sum of at least a portion of signals in the at least one overlap region to increase the signal-to-noise ratio.

5. The device of claim 4, wherein the at least one computer performs a weighted sum of at least a portion of signals in the at least one overlap region to increase the signal-to-noise ratio.

6. The device of claim 1, wherein the at least one computer is configured to combine signals in at least one overlap region to remove or suppress at least some noise.

7. The device of claim 1, wherein the at least one computer is configured to combine signals in at least one overlap region to enhance at least some subject matter in the at least one image.

8. The device of claim 1, wherein the at least one computer is configured to combine signals in at least one overlap region to increase detected quantum efficiency.

9. The device of claim 1, wherein the plurality of cameras includes a plurality of sets of cameras comprising at least a first set of cameras to provide signals corresponding to a first image layer substantially corresponding to the combined field of view of the plurality of cameras and a second set of cameras to provide signals corresponding to a second image layer substantially corresponding to the combined field of view of the plurality of cameras, and wherein the at least one computer is configured process the signals from the first image layer to generate a first image substantially corresponding to the combined field of view of the plurality of cameras and configured to process the signals from the second image layer to generate a second image substantially corresponding to the combined field of view of the plurality of cameras.

10. The device of claim 9, wherein the at least one computer is configured to combine corresponding pixels from the first image and the second image to form, at least in part, the combined image.

11. The device of claim 10, wherein the at least one computer is configured to perform a sum of corresponding pixels of the first image and the second image to, at least in part, form the combined image.

12. The device of claim 10, wherein the at least one computer is configured to perform an average and/or a weighted average of corresponding pixels of the first image and the second image to, at least in part, form the at least one image.

13. The device of claim 9, wherein the plurality of sets of cameras comprises more than two sets of cameras to produce more than two image layers, each of the more than two layers substantially corresponding to the combined field of view of the plurality of cameras, and wherein the at least one computer is configured process the signals from the more than two image layers to produce more than two images, each of the more than two images substantially corresponding to the combined field of view of the plurality of cameras.

14. The device of claim 1, wherein the at least one computer is configured to establish a gain for each of the plurality of cameras.

15. The device of claim 1, wherein each of the plurality of cameras includes a CMOS camera.

16. The device of claim 1, further comprising at least one blocking component positioned between the energy conversion component and the plurality of cameras to block at least some of the first radiation that passes through the energy conversion component unconverted.

17. The device of claim 16, wherein the blocking component includes at least one of a leaded glass or a lead coating.

18. The device of claim 16, wherein the at least one blocking component includes a blocking layer over each lens of the plurality of cameras.

19. The device of claim 16, further comprising at least one refraction component positioned between the energy conversion component and the plurality of cameras to refract at least some of the second radiation emitted by the energy conversion component onto corresponding cameras of the plurality of cameras, wherein the at least one refraction component includes the blocking component by using a high refraction leaded glass layer or by forming on the at least one refraction component a leaded glass coating.

20. The device of claim 19, wherein the at least one refraction component and the blocking component are separate.

* * * * *